United States Patent
Krasnov et al.

(10) Patent No.: US 10,526,242 B2
(45) Date of Patent: Jan. 7, 2020

(54) COATED ARTICLE SUPPORTING TITANIUM-BASED COATING, AND METHOD OF MAKING THE SAME

(71) Applicant: Guardian Glass, LLC, Auburn Hills, MI (US)

(72) Inventors: Alexey Krasnov, Canton, MI (US); Jian-gang Weng, Canton, MI (US); Xuequn Hu, Northville, MI (US)

(73) Assignee: Guardian Glass, LLC, Auburn Hills, MI (US)

( * ) Notice: Subject to any disclaimer, the term of this patent is extended or adjusted under 35 U.S.C. 154(b) by 22 days.

(21) Appl. No.: 15/206,728

(22) Filed: Jul. 11, 2016

(65) Prior Publication Data
US 2018/0009704 A1    Jan. 11, 2018

(51) Int. Cl.
*C03C 17/245* (2006.01)
*C03C 17/34* (2006.01)

(52) U.S. Cl.
CPC ...... *C03C 17/2456* (2013.01); *C03C 17/3435* (2013.01); *C03C 2217/212* (2013.01);
(Continued)

(58) Field of Classification Search
CPC . C03C 17/2456; C03C 17/27; C03C 17/3435; C03C 2217/71; C03C 2217/734;
(Continued)

(56) References Cited

U.S. PATENT DOCUMENTS

| | | | |
|---|---|---|---|
| 4,188,452 A | 2/1980 | Groth | |
| 4,216,259 A | 8/1980 | Groth | |

(Continued)

FOREIGN PATENT DOCUMENTS

| | | |
|---|---|---|
| GB | 2 029 861 | 3/1980 |
| GB | 2 051 878 | 1/1981 |
| WO | WO 2005/022624 | 3/2005 |

OTHER PUBLICATIONS

Mohamed et al. "Effect of heat treatment on structural, optical and mechanical properties of sputtered TiOxNy films", Thin Solid Films 468, (May 2004), pp. 48-56 (Year: 2004).*

(Continued)

*Primary Examiner* — Rodney G McDonald
(74) *Attorney, Agent, or Firm* — Nixon & Vanderhye P.C.

(57) ABSTRACT

Certain example embodiments of this invention relate to techniques for converting sputter-deposited TiNx or TiOxNy layers into TiOx layers via activation with electromagnetic radiation. An intermediate layer including TiOxNy, $0<y\leq1$ is formed on a substrate. The intermediate layer is exposed to the radiation, which is preferentially absorbed by the intermediate layer in an amount sufficient to heat the intermediate layer to a temperature of 500-650 degrees C. while keeping the substrate at a significantly lower temperature. A flash light operated with a series of millisecond or sub-millisecond length pulses may be used in this regard. The converting removes nitrogen from, and introduces oxygen into, the intermediate layer, causing the layer to expand beyond its initial thickness. At least some of the final layer may have an anatase phase, and it may be photocatalytic. These layers may be used in low-maintenance glass, antireflective, and/or other applications.

21 Claims, 3 Drawing Sheets

(52) U.S. Cl.
CPC .... *C03C 2217/71* (2013.01); *C03C 2217/734* (2013.01); *C03C 2218/154* (2013.01); *C03C 2218/32* (2013.01)

(58) Field of Classification Search
CPC ........ C03C 2217/948; C03C 2217/212; C03C 2218/154; C03C 2218/32; C03C 2218/322; C23C 14/0036; C23C 14/0641; C23C 14/0676; C23C 14/083
USPC ...................................... 204/192.12, 192.15
See application file for complete search history.

(56) References Cited

U.S. PATENT DOCUMENTS

| | | | |
|---|---|---|---|
| 8,318,312 | B2 | 11/2012 | Petrmichl et al. |
| 8,518,475 | B2 | 8/2013 | Veerasamy |
| 8,580,355 | B2 | 11/2013 | Durandeau et al. |
| 8,871,349 | B2 | 10/2014 | Lemmer et al. |
| 2002/0045073 | A1* | 4/2002 | Finley ................ C03C 17/3417 428/701 |
| 2011/0101368 | A1* | 5/2011 | Im ..................... H01L 21/02422 257/75 |
| 2012/0057236 | A1 | 3/2012 | Broadway et al. |
| 2012/0171439 | A1 | 7/2012 | Kharchenko et al. |

OTHER PUBLICATIONS

Akazawa, "Transparent Conductor: TiOxNy", Japanese Journal of Applied Physics 49 (Aug. 2010) 080215 (Year: 2010).*

Akazawa, "Sputtering characteristics, crystal structures, and transparent conductive properties of TiOxNy films deposited on α-Al2O3(0001) and glass substrates", Applied Surface Science, 263 (Sep. 2012), 307-313. (Year: 2012).*

"Glass with Modified Titanium Coatings"; Surkin et al., Science for Glass Production; vol. 65, Nos. 11-12, Apr. 2, 2009, pp. 381-383.

* cited by examiner

COATED ARTICLE SUPPORTING TITANIUM-BASED COATING, AND METHOD OF MAKING THE SAME

TECHNICAL FIELD

Certain example embodiments of this invention relate to coated articles that support titanium-based coatings, and methods of making the same. More particularly, certain example embodiments of this invention relate to techniques for converting sputter-deposited TiNx or TiOxNy layers into TiOx layers via thermal activation.

BACKGROUND AND SUMMARY

So-called low-maintenance glass (LMG) is known in the art. LMG typically includes a glass substrate supporting a plurality of thin film layers in a layer stack. A thin layer comprising titanium oxide (TiOx), usually in the anatase phase with or without some rutile presence, is provided as the outermost layer in the layer stack. The primarily anatase phase of the layer comprising TiOx allows for photocatalytic properties to be realized, which can help in providing "self-cleaning" properties advantageous for the low-maintenance glass.

To achieve the anatase phase in such coatings, it is typical to deposit titanium oxide at room temperature and then heat treat at high temperatures the coated article with the layer comprising titanium thereon. For example, heat treatment temperatures of at least 650 degrees C. are commonly used in helping to ensure that room-temperature deposited titanium oxide is converted to, or otherwise primarily is in, the anatase phase, since as-deposited layers comprising TiOx typically have an amorphous structure and do not provide much, if any, low maintenance related functionality. This sort of post-deposition activation may be accomplished by using convection or radiative sources, including flash-bulb heating, to achieve the goal of the TiOx activation. In some cases, an additional absorbing layer or an exothermic layer may be introduced to aid in converting the heat of a radiative source into activation energy. See, for example, U.S. Pat. No. 8,580,355, the entire contents of which are hereby incorporated herein by reference.

It is desirable to provide a layer comprising TiOx with low stress. This can be especially desirable in a layer stack where the layer comprising TiOx has a substantial thickness (e.g., 70 nm or greater). Unfortunately, however, layers comprising TiOx oftentimes are formed with high tensile stresses. This tendency sometimes is exaggerated in relatively thick layers comprising TiOx, especially when such layers are thermally activated. The tensile stress oftentimes results in the formation of microscopic cracks (also sometimes called "tick marks"), which can compromise the layer's integrity and lead to further damage by permitting the ingress of moisture, reactive ions, etc.

Thus, it will be appreciated that there is a need in the art for techniques for overcoming the above-described and/or other disadvantages. For example, it will be appreciated that it would be desirable to form layers comprising TiOx that lack microscopic cracks or tick marks, e.g., when provided in an anatase or primarily anatase phase.

Certain example embodiments relate to a method of making a coated article including a thin film coating supported by a substrate. An intermediate layer comprising TiOxNy, $0<y\leq1$, is formed, directly or indirectly, on the substrate. The as-formed intermediate layer is converted into a layer comprising or consisting essentially of TiOx by exposing the as-formed intermediate layer to a source of electromagnetic radiation, with the layer comprising or consisting essentially of TiOx being the outermost layer in the thin film coating. Electromagnetic radiation used in the converting is preferentially absorbed by the intermediate layer in an amount sufficient to heat the intermediate layer to a temperature of 500-600 degrees C. while keeping the substrate at a temperature below 500 degrees C. (more preferably below 300 degrees C.).

Certain example embodiments relate to a method of making a coated article including a thin film coating supported by a substrate. An intermediate layer comprising Ti and N is sputter-deposited, directly or indirectly, on the outermost surface the substrate. Following the sputter-deposition, the sputter-deposited intermediate layer is exposed to radiation to convert the intermediate layer into a layer comprising TiOx.

In certain example embodiments, the intermediate layer may be formed to a first thickness, and the conversion may remove nitrogen from, and introduce oxygen into, the intermediate layer, so as to cause the layer comprising or consisting essentially of TiOx to have a second thickness that is at least an 70% expansion beyond the first thickness.

The intermediate layer may be formed using room temperature or an elevated temperature of sputter deposition, in certain example embodiments.

A majority of the layer comprising or consisting essentially of TiOx may have an anatase phase, and/or the layer comprising or consisting essentially of TiOx may be photocatalytic, in certain example embodiments.

In certain example embodiments, radiation may come from a flash light operated with a series of pulses of no more than 10 ms in length.

Coated articles, insulating glass (IG) units, and/or the like, made using these methods, and products incorporating such articles, also are contemplated herein. For example, TiOx layers made using the techniques of certain example embodiments may be used in low-maintenance glass, antireflective, and/or other applications, in windows, merchandizers, and/or the like.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION

Certain example embodiments relate to post-deposition activating a TiNx or TiOxNy layer in order to convert it into a TiOx stress-free or slightly compressively stressed thin film. Referring now more particularly to the drawings in which like numerals indicate like parts throughout the several views, FIG. 1 demonstrates a sputter-deposited TiNx or TiOxNy layer being converted into a TiOx layer via thermal activation, in accordance with certain example embodiments. The FIG. 1 coated article includes a glass substrate 102 that supports a thin film comprising Ti and N 106. The thin film comprising Ti and N 106 may be a layer comprising or consisting essentially of TiNx or TiOxNy in different example embodiments. Tuning the nitrogen level of the as-deposited film allows for flexibility in the stress management of the resultant film (and potentially the layer stack as a whole) and, in particular, allows a stress-free or an often-desirable compressively stressed state to be achieved for the resultant film and potentially the layer stack as a whole.

The as-deposited thin film comprising Ti and N 106 may be non-oxidized, sub-oxidized (partially oxidized), or fully oxidized, in different example embodiments. Sub-oxidization of the as-deposited film may advantageously allow for a greater degree of light absorption in a wider range of wavelengths in certain example embodiments, which may facilitate the activation (e.g., such that additional absorbing or exothermic layers are not needed in certain example instances) depending, for example, on how the as-deposited thin film comprising Ti and N 106 is to be activated. For example, because more radiation may be absorbed in some implementations, it may in certain example embodiments be possible to better control the activation temperature of the as-deposited film largely independent of the underlying substrate temperature. Sub-oxidization of the as-deposited thin film comprising Ti and N 106 also may be advantageous because the layer can be "packed" with oxygen during its activation, causing the layer to grow and achieve desirable optical properties (such as, for example, transparency).

Figure 1:
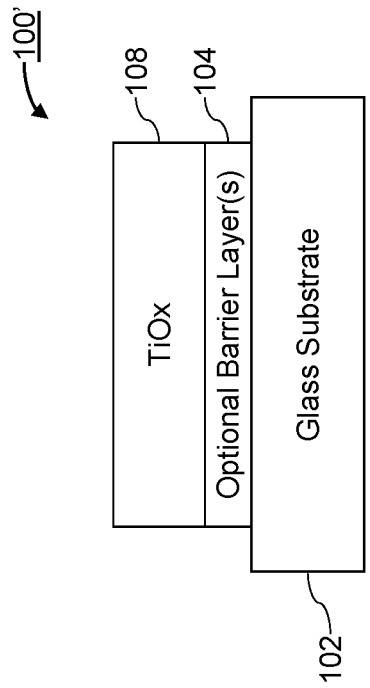
FIG. 1 demonstrates a sputter-deposited TiNx or TiOxNy layer being converted into a TiOx layer via thermal activation, in accordance with certain example embodiments.
Figure 1:
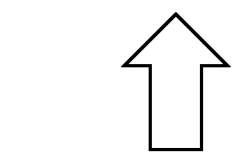
Figure 1:
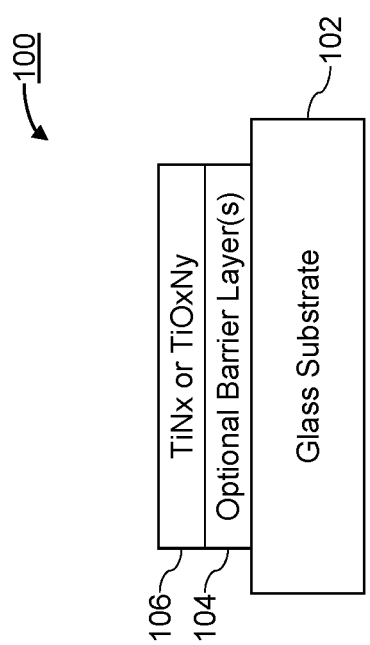

The as-deposited thin film comprising Ti and N 106 may be activated via convective, radiative, flash bulb heating, laser annealing, and/or other means, e.g., as indicated by the large arrow in FIG. 1. It will be appreciated that the activation may be practiced by irradiating the thin film comprising Ti and N 106 using incoherent or coherent electromagnetic radiation. Once activated, the thin film comprising Ti and N 106 is transformed into a layer comprising or consisting of TiOx 108. Nitrogen from the as-deposited thin film comprising Ti and N 106 may be removed and/or replaced with oxygen in the layer comprising or consisting of TiOx 108. The coated article 100', post activation, still includes a substrate 102 and the optional barrier layer(s) 104. The activation may cause the layer comprising or consisting of TiOx 108 to have a phase that is anatase or primarily anatase (e.g., some rutile phase may remain in the activated coating). In so doing, the activation may cause the layer comprising or consisting of TiOx 108 to have photocatalytic properties.

Certain example embodiments may use a rapid activation process, e.g., using pulsed (sub-millisecond or millisecond range) flash light, allowing for a substantial thermal discrimination between the film and the substrate (with the melting point of the latter typically being about 600 degrees C.). As used herein, "sub-millisecond" refers to a time period of no more than 1 millisecond and "millisecond range" refers to a time period of no more than 999 milliseconds. That is, as alluded to above, using TiNx or TiOxNy with a higher optical absorption in a wider wavelength range compared to the more transparent TiOx makes the possibility for such discrimination more practical, and the rapid-heating process of certain example embodiments can convert the as-deposited layer into a layer comprising or consisting of TiOx without intentionally or significantly heating the glass substrates, e.g., because the as-deposited layer may be preferentially heated. Preferably, the substrate temperature increases to no more than 300 degrees C., more preferably no more than 250 degrees C., and still more preferably to no more than 100 degrees C., as a result of the activation. By contrast, the thin film comprising TiNx or TiOxNy preferably is heated to a temperature of 300-700 degrees C., more preferably 400-650 degrees C., and still more preferably 500-600 or 500-650 degrees C.

Non-uniform heating of the coated article and the layers formed thereon may be achieved, e.g., wherein the as-deposited thin film comprising Ti and N 106 can be preferentially heated compared to the substrate and/or other layers. This is advantageous when forming the TiOx, and possibly changing the phase of the TiOx that is formed, because it enables the optical properties of the TiOx to be changed in a controlled or tunable manner without significantly adversely affecting the underlying materials. Indeed, Ti is a good absorber at the band gap if the wavelength is selected correctly. Short wavelengths in the UV spectrum may be suitable for pulsed activation, for example.

Nitriding the Ti may be advantageous in certain example embodiments because the sputter deposition rate of TiNx and TiOxNy will be higher compared to that of TiOx, thereby enabling line speed of the deposition process to be increased. For example, it is well known that TiOx cathodes have relatively low deposition rates. Assuming a thickness of 22 nm is desired for a layer of TiOx (e.g., as otherwise would be appropriate for use in the FIG. 2 and FIG. 3 examples, discussed in detail below) and a production power of 110 kW from a power supply, the dynamic deposition rate (DDR) of 0.3 would imply a maximum line speed of about 1.5 m/min. Line speed increases linearly or generally linearly with DDR, and certain example embodiments are able to provide a 0.25-3× increase in maximum line speed compared to deposition of TiOx.

Referring once again to FIG. 1, one or more optional barrier layers 104 may be interposed between the glass substrate 102 and the thin film comprising Ti and N 106. The thin film comprising Ti and N 106 and the optional barrier layer(s) 104 are sputter deposited in certain example embodiments. Room temperature sputtering may be used in some example instances.

As will be appreciated from FIG. 1, the activation also causes a thickness increase in the layer comprising or consisting of TiOx 108 as compared to the as-deposited thin film comprising Ti and N 106. The following table demonstrates the theoretical volume expansion that occurs when transforming TiN to $TiO_2$.

|  | Molar Mass (g/mol) | Density (g/cm$^3$) | Volume/Mole (cm$^3$/mol) | Expansion = Oxide/Nitride |
|---|---|---|---|---|
| TiN | 61.87 | 5.22 | 11.85 | 1.78 |
| $TiO_2$ | 79.87 | 3.78 | 21.13 | |

It will be appreciated that the volume expansion possible in certain example embodiments preferably is at least a 50% of volume expansion and may be up to a 300% of volume expansion, with typical volume expansion ranges being from 75%-150% and typically 80%-100%. Deviations may occur based on, for example, the stoichiometry of the as-deposited and transformed layer.

In certain example embodiments, a dopant (such as, for example, Ta, Nb, or the like) can be included in the thin film comprising Ti and Ni 106. This may be performed via co-sputtering, ion beam assisted deposition, ion beam implantation, and/or the like. The inclusion of a dopant may be useful in making the film electrically conductive after activation (and possibly also before activation). Dopants also may be used to help increase sensitivity to the radiation used in activation in certain example embodiments.

The example techniques disclosed herein may be used in connection with a variety of different applications including, for example low-maintenance glass (LMG), antireflective coatings, and/or other applications. Several examples are discussed below in connection with FIGS. 2-4, although it will be appreciated that other applications may be benefit from the technology disclosed herein, and that the TiOx layers made by the techniques disclosed herein may be used in different layer stack configurations in the same or different applications. Indeed, the example techniques are suitable for a variety of different applications where a layer comprising TiOx might otherwise not be suitable, as the example layers described herein can be deposited quickly, lack tick mark and other defects, can be activated in a manner that does not significantly thermally disturb underlying layers and/or the substrate because of the more targeted activation energy used, have desirable stress properties, etc.

Figure 2:
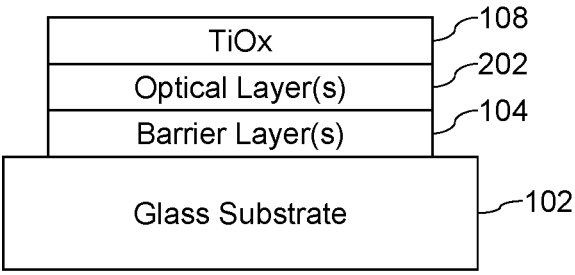
FIG. 2 is a schematic view of a coated article supporting a first example low-maintenance coating, which may be made using the techniques of certain example embodiments.

FIG. 2 is a schematic view of a coated article 200 supporting a first example low-maintenance coating, which may be made using the techniques of certain example embodiments. The FIG. 2 example coated article 200 includes a glass substrate 102 supporting, in order moving away from a major surface thereof, one or more barrier layers 104, one or more optical layers 202, and a layer comprising or consisting of TiOx 108 made from a thin film comprising Ti and Ni 106. The one or more barrier layers 104 and the one or more optical layers 202 may be dielectric thin film layers in certain example embodiments. The optical layer(s) 202 may be of or include a metal layer in certain example embodiments. The one or more barrier layers 104 and the one or more optical layers 202 may include, for example, one or more silicon-inclusive layers (e.g., one or more layers including silicon oxide, silicon nitride, silicon oxinitride, and/or the like). Silicon-inclusive layers are well suited to serving as barrier layers, for example. Optical layer(s) 202 additionally or alternatively may include a layer comprising tin oxide, a layer comprising zinc oxide (which may be doped with aluminum), and/or the like. The layer comprising or consisting of TiOx 108 may be the outermost layer in the layer stack. The FIG. 2 example coated article 200 provides LMG functionality because the outermost layer comprising or consisting of TiOx 108 is photocatalytic and therefore "self-cleaning" to at least some extent. The coating in the FIG. 2 example may be provided on an outermost surface of a window or the like. The layer comprising or consisting of TiOx 108 preferably is 10-200 nm thick, more preferably 15-100 nm thick, with an example thickness being 22 nm.

Figure 3:
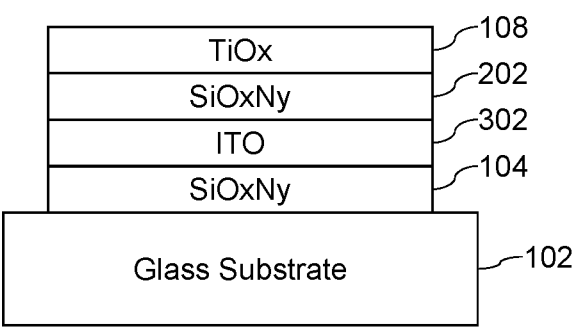
FIG. 3 is a schematic view of a coated article supporting a second example low-maintenance coating, which may be made using the techniques of certain example embodiments.

FIG. 3 is a schematic view of a coated article 300 supporting a second example low-maintenance coating, which may be made using the techniques of certain example embodiments. The FIG. 3 example coated article 300 is somewhat similar to the FIG. 2 example coated article 200, e.g., in that it includes one or more barrier layers 104 adjacent the glass substrate 102, as well as an outermost layer that is a layer comprising or consisting of TiOx 108 made from a thin film comprising Ti and Ni 106. As above, the FIG. 3 example coated article 300 provides LMG functionality because the outermost layer comprising or consisting of TiOx 108 is photocatalytic and therefore "self-cleaning" to at least some extent. The coating in the FIG. 3 example may be provided on an outermost surface of a window or the like.

The FIG. 3 example coated article 300 also provides anti-condensation functionality by virtue of the conductive layer 302. In the FIG. 3 example, the conductive layer 302 comprises ITO. The conductive layer is heatable, actively or passively, to help suppress the formation of condensation and/or to help dissipate condensation that has built up. One or more optical layers 202 may be provided between the conductive layer 302 and the layer comprising or consisting of TiOx 108, e.g., as both the conductive layer 302 and the layer comprising or consisting of TiOx 108 may have high indexes of refraction.

The one or more barrier layers 104 and the one or more optical layers 202 may be low or medium index of refraction layers in certain example embodiments. For example, each layer may have an index of refraction of 1.1-1.8, more preferably 1.4-1.7, with an example barrier layer 104 comprising SiOxNy and having an index of refraction of about 1.66, and with an example optical layer 202 also comprising SiOxNy and having an index of refraction of about 1.68. Example materials and thicknesses for the FIG. 3 example coated article 300 are provided in the following table:

| Layer | Preferred Thickness (nm) | More Preferred Thickness (nm) | Example Thickness (nm) |
|---|---|---|---|
| Barrier Layer 104 (SiOxNy) | 1-500 | 10-250 | 55 |
| Conductive Layer 302 (ITO) | 75-150 | 85-125 | 105 |
| Optical Layer 202 (SiOxNy) | 10-200 | 40-80 | 59 |
| TiOx Overcoat 108 | 10-200 | 15-100 | 22 |

Figure 4:
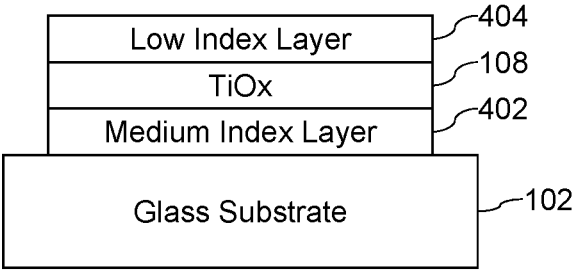
FIG. 4 is a schematic view of a coated article supporting an example antireflective coating, which may be made using the techniques of certain example embodiments.

FIG. 4 is a schematic view of a coated article 400 supporting an example antireflective coating, which may be made using the techniques of certain example embodiments. The FIG. 4 example coated article 400 supports, in order moving away from the substrate 102, medium, high, and low index of refraction layers 402, 108, and 404. In certain example embodiments, these layers may directly contact one another. The layer stack design described in U.S. Publication No. 2012/0057236 may be used in connection with certain example embodiments, and its entire contents is hereby incorporated herein by reference.

In this example embodiment, the high index layer is the layer comprising or consisting of TiOx 108 made from a thin film comprising Ti and Ni 106. This layer may be activated before or after the low index layer 404 is formed on the substrate 102 in different example embodiments. For example, if the materials and heating profiles are carefully selected, it is possible to activate the layer comprising or consisting of TiOx 108 after the low index layer 404 is formed thereon because the former can be preferentially heated. In certain example embodiments, the low index layer 404 may be of or include silicon or an oxide thereof (e.g., $SiO_2$ or other suitable stoichiometry), MgF, or their alloyed oxide and fluoride. The layer comprising or consisting of TiOx 108 has an index of refraction of at least about 2.0, preferably from about 2.1 to 2.7, more preferably from about 2.25 to 2.55, and most preferably from about 2.3 to 2.5 (at 550 nm) in certain example embodiments. In certain example embodiments, an ideal index of refraction of high index layer 108 at 380 nm may be from about 2.7 to 2.9 (and all subranges therebetween). In further example embodiments, an ideal index of refraction of high index layer 108 at 780 nm may be from about 2.2 to 2.4 (and all subranges therebetween). The high index layer 108 preferably has a thickness of from about 5 to 50 nm, more preferably from about 10 to 35 nm, even more preferably from about 12 to 22 nm, and most preferably from about 15 to 22 nm. In certain exemplary embodiments, the high index layer 108 has a thickness of less than about 25 nm. Because it is possible to engineer a no-stress or slightly compressively stressed layer 108, the overall durability of the AR coating can be improved.

In certain example embodiments, the medium index layer 402 is the bottom layer of the AR coating and has an index of refraction of from about 1.60 to 2.0, more preferably from about 1.65 to 1.9, even more preferably from about 1.7 to 1.8, and most preferably from about 1.7 to 1.79 (at 550 nm). At 380 nm, in certain example embodiments, an ideal refractive index of medium index layer 402 is from about 1.8 to 2.0. In further example embodiments, the index of refraction of medium index layer 402 is from about 1.65-1.8 at 780 nm. Medium index layer 402 preferably has a thickness of from about 75 to 135 nm, more preferably from about 80 to 130 nm, even more preferably from about 89 to 120 nm, and most preferably from about 94 to 115 nm. A layer of or comprising silicon oxynitride (e.g., SiOxNy) advantageously has a compressive residual stress in both the as-coated and heat-treated states and is suitable for use as a medium index layer 402.

In certain example embodiments, the low index layer 404 is provided over the high index layer 108. The low index layer 404 has an index of refraction of from about 1.4 to 1.6, more preferably from about 1.45 to 1.55, and most preferably from about 1.48 to 1.52 (at 550 nm) in certain example embodiments. In certain example embodiments, an ideal index of refraction of low index layer 404 at 380 nm may be from about 1.48 to 1.52 (and all subranges therebetween). In further example embodiments, an ideal index of refraction of low index layer 404 at 780 nm may be from about 1.46 to 1.5 (and all subranges therebetween). In certain example embodiments, low index layer 404 has a thickness of from about 70 to 130 nm, more preferably from about 80 to 120 nm, even more preferably from about 89 to 109 nm, and most preferably from about 100 to 110 nm. The use of silicon oxide (e.g., SiOx) as the low index layer in a temperable three layer AR coating in certain example embodiments is advantageous because silicon oxide has a low refractive index, and high chemical and mechanical durability. Additionally, in certain example embodiments, a low index layer based on silicon oxide advantageously has a compressive residual stress in both the as-coated and heat-treated/tempered states.

The AR coating of FIG. 4 may be provided on one or both major surfaces of the glass substrate 102.

In certain example embodiments, an AR coating may be provided on one major surface of the glass substrate 102 and a layer comprising TiOx that is photocatalytic and made using the techniques described herein may be provided on the other major surface of the glass substrate 102. In such cases, another different material may be used for the high index layer of the AR coating in some instances. In certain example embodiments, a layer comprising silicon (e.g., a layer comprising silicon nitride) may be provided under the layer comprising TiOx that is on the surface of the glass substrate 102 opposite the AR coating.

In certain example embodiments, a layer comprising TiOx that is photocatalytic may be provided over the glass/medium/high/low stack as an outermost layer. In such cases, this outermost layer comprising TiOx may be made using the techniques described herein, and another different material may be used for the high index layer of the AR coating in some instances.

Figure 5:
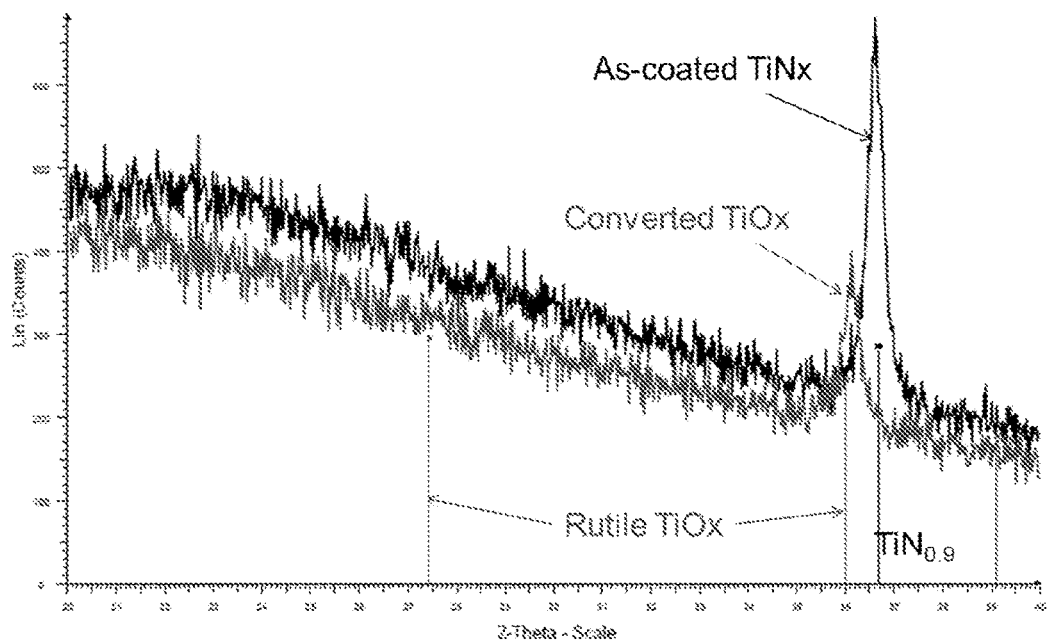
FIG. 5 is a graph showing X-Ray Diffraction (XRD) curves of as-coated TiNx and TiOx converted therefrom, in accordance with certain example embodiments.

FIG. 5 is a graph showing X-Ray Diffraction (XRD) curves of as-coated TiNx and TiOx converted therefrom, in accordance with certain example embodiments. XRD analysis aids in understanding the crystalline structure of the TiOx converted from the TiNx. FIG. 5 demonstrates a change in the crystallinity of the TiOx converted from the as-deposited TiNx, as detected by the X-Ray Diffraction XRD analysis. The converted TiOx layer shows some rutile crystalline structure remaining. It will be appreciated that the final crystal structure of converted TiOx may be affected by the process conditions used in creating the as-deposited TiNx layer, so care may be taken in selecting the oxygen and/or nitrogen content used in forming the as-deposited TiNx layer.

In certain example embodiments, at least a majority of the TiOx layer will be in the anatase phase, e.g., in cases where it is desirable to provide photocatalytic properties. In such cases, in certain example embodiments, at least 75% (more preferably at least 85%, and still more preferably at least 90%) of the TiOx layer will be in the anatase phase.

Although certain example embodiments have been described in connection with the conversion of layers comprising Ti and N into TiOx, it will be appreciated that the example techniques described herein may be used in connection with pure Ti metallic layers and other Ti-inclusive compounds (which may have a higher DDR than TiOx).

Although certain example embodiments have been described as including glass substrates, it will be appreciated that the example techniques described herein are compatible with other types of substrates (e.g., because the substrates are not significantly heated). Plastic substrates and/or the like therefore may be used in certain example embodiments.

The substrates described herein may be heat treated (e.g., heat strengthened and/or thermally tempered), and/or chemically tempered, in certain example embodiments. For example, because tempered substrates would not be significantly heated, they may retain all or substantially all of their temper strength (e.g., at least 80%, more preferably at least 90%, and still more preferably 95% or more of their temper strength).

The terms "heat treatment" and "heat treating" as used herein mean heating the article to a temperature sufficient to achieve thermal tempering and/or heat strengthening of the glass inclusive article. This definition includes, for example, heating a coated article in an oven or furnace at a temperature of at least about 550 degrees C., more preferably at least about 580 degrees C., more preferably at least about 600 degrees C., more preferably at least about 620 degrees C., and most preferably at least about 650 degrees C. for a sufficient period to allow tempering and/or heat strengthening. This may be for at least about two minutes, or up to about 10 minutes, in certain example embodiments.

Although an element, layer, layer system, coating, or the like, may be said to be "on" or "supported by" a substrate, layer, layer system, coating, or the like, other layers and/or materials may be provided therebetween.

In certain example embodiments, there is provided a method of making a coated article including a thin film coating supported by a substrate. An intermediate layer comprising TiOxNy, 0<y≤1 is formed, directly or indirectly, on the outermost surface of a layer stack. The as-formed intermediate layer is converted into a layer comprising or consisting essentially of TiOx by exposing the as-formed intermediate layer to a source of electromagnetic radiation, the layer comprising or consisting essentially of TiOx being the outermost layer in the thin film coating. Electromagnetic radiation used in the converting is preferentially absorbed by the intermediate layer in an amount sufficient to heat the intermediate layer to a temperature of 500-600 degrees C. while keeping the substrate at a temperature below 300 degrees C.

In addition to the features of the previous paragraph, in certain example embodiments, the intermediate layer may be formed to a first thickness, and the converting may remove nitrogen from, and introduce oxygen into, the intermediate layer, causing the layer comprising or consisting essentially of TiOx to have a second thickness that is at least a 70% expansion beyond the first thickness.

In addition to the features of either of the two previous paragraphs, in certain example embodiments, the forming of the intermediate layer may be practiced by room temperature sputter deposition.

In addition to the features of any of the three previous paragraphs, in certain example embodiments, at least some of the layer comprising or consisting essentially of TiOx may have an anatase phase.

In addition to the features of any of the four previous paragraphs, in certain example embodiments, a majority of the layer comprising or consisting essentially of TiOx may have an anatase phase, and/or the layer comprising or consisting essentially of TiOx may be photocatalytic.

In addition to the features of any of the five previous paragraphs, in certain example embodiments, the thin film coating may be a self-cleaning coating.

In addition to the features of any of the six previous paragraphs, in certain example embodiments, another multi-layer thin film coating may be formed on another major surface the substrate.

In addition to the features of any of the seven previous paragraphs, in certain example embodiments, the source of electromagnetic radiation may be a flash light, e.g., operated with a series of pulses of no more than 10 ms in length.

In certain example embodiments, there is provided a method of making a coated article including a thin film coating supported by a substrate. An intermediate layer comprising Ti and N is sputter-deposited, directly or indirectly, on a first major surface the substrate. Following the sputter-deposition, the sputter-deposited intermediate layer is exposed to radiation to convert the intermediate layer into a layer comprising TiOx.

In addition to the features of the previous paragraph, in certain example embodiments, the intermediate layer may comprise TiOxNy.

In addition to the features of either of the two previous paragraphs, in certain example embodiments, the intermediate layer may comprise TiNx.

In addition to the features of any of the three previous paragraphs, in certain example embodiments, the exposing may convert the intermediate layer into the layer comprising TiOx and/or may cause the layer comprising TiOx to be anatase in phase.

In addition to the features of any of the four previous paragraphs, in certain example embodiments, the intermediate layer, as coated, may be amorphous in phase.

In addition to the features of any of the five previous paragraphs, in certain example embodiments, the layer comprising TiOx may include oxygen but may be sub-oxidized.

In addition to the features of any of the six previous paragraphs, in certain example embodiments, the layer comprising TiOx may include oxygen but may be fully or substantially fully oxidized.

In addition to the features of any of the seven previous paragraphs, in certain example embodiments, the radiation may be provided using a flash light, (e.g., the flash light may be operated with a series of pulses of no more than 10 ms); and/or using a convection or radiative oven.

In addition to the features of any of the eight previous paragraphs, in certain example embodiments, the exposing of the sputter-deposited intermediate layer may cause the intermediate layer to reach a temperature of at least 500 degrees C.

In addition to the features of any of the nine previous paragraphs, in certain example embodiments, the substrate may reach a temperature of no more than 500 degrees C. as a result of the exposing.

In addition to the features of any of the 10 previous paragraphs, in certain example embodiments, the intermediate layer, as deposited, may be doped.

In addition to the features of any of the 11 previous paragraphs, in certain example embodiments, the intermediate layer, as deposited, may be doped with dopants sufficient to make the intermediate layer, and/or the layer comprising TiOx, electrically conductive.

In addition to the features of either of the two previous paragraphs, in certain example embodiments, the dopants may include Ta and/or Nb dopants.

In addition to the features of any of the 13 previous paragraphs, in certain example embodiments, the layer comprising TiOx may be the outermost layer in the thin film coating.

In addition to the features of any of the 14 previous paragraphs, in certain example embodiments, the sputter-depositing of the intermediate layer may be room temperature sputtering.

A coated article may be made by the method of any of the 23 previous paragraphs, in certain example embodiments.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making a coated article including a thin film coating supported by a substrate, the method comprising:
   forming an intermediate conductive layer comprising titanium oxynitride, directly or indirectly, on the outermost surface of a transparent layer stack comprising a transparent conductive layer provided between at least first and second dielectric layers;
   converting the as-formed intermediate layer into a layer comprising or consisting essentially of titanium oxide by exposing the as-formed intermediate layer to a source of electromagnetic radiation, the layer comprising or consisting essentially of titanium oxide being the outermost layer in the thin film coating;
   wherein electromagnetic radiation used in the converting is preferentially absorbed by the intermediate layer in an amount sufficient to heat the intermediate layer to a temperature of 500-600 degrees C. while keeping the substrate at a temperature below 300 degrees C.; and wherein the intermediate layer comprising titanium oxynitride, as deposited, is doped with at least one dopant sufficient to make the intermediate layer, and the layer comprising titanium oxide, electrically conductive.

2. The method of claim 1, wherein:

the intermediate layer is formed to a first thickness, and the converting removes nitrogen from, and introduces oxygen into, the intermediate layer, causing the layer comprising or consisting essentially of titanium oxide to have a second thickness that is at least a 70% expansion beyond the first thickness.

3. The method of claim 1, wherein the forming of the intermediate layer is practiced by room temperature sputter deposition.

4. The method of claim 1, wherein at least some of the layer comprising or consisting essentially of titanium oxide has an anatase phase.

5. The method of claim 4, wherein a majority of the layer comprising or consisting essentially of titanium oxide has an anatase phase, the layer comprising or consisting essentially of titanium oxide being photocatalytic.

6. The method of claim 5, wherein the thin film coating is a self-cleaning coating.

7. The method of claim 6, further comprising forming another multi-layer thin film coating on another major surface the substrate.

8. The method of claim 1, wherein the source of electromagnetic radiation is a flash light operated with a series of pulses of no more than 10 ms in length.

9. A method of making a coated article including a thin film coating supported by a substrate, the method comprising:

sputter-depositing a conductive intermediate layer comprising titanium oxynitride, directly or indirectly, on a first major surface the substrate; and following the sputter-deposition, exposing the sputter-deposited intermediate layer to radiation to convert the intermediate layer into a layer comprising titanium oxide, wherein the intermediate layer comprising titanium oxynitride, as deposited, is doped with at least one dopant sufficient to make the intermediate layer, and the layer comprising titanium oxide, electrically conductive.

10. The method of claim 9, wherein the exposing converts the intermediate layer into the layer comprising titanium oxide and causes the layer comprising titanium oxide to be anatase in phase.

11. The method of claim 9, wherein the intermediate layer, as coated, is amorphous in phase.

12. The method of claim 9, wherein the layer comprising titanium oxide includes oxygen and is sub-oxidized.

13. The method of claim 9, wherein the layer comprising titanium oxide includes oxygen and is fully or substantially fully oxidized.

14. The method of claim 9, wherein the radiation is provided using a flash light.

15. The method of claim 14, further comprising operating the flash light with a series of pulses of no more than 10 ms.

16. The method of claim 9, wherein the radiation is provided using a convection or radiative oven.

17. The method of claim 9, wherein the exposing of the sputter-deposited intermediate layer causes the intermediate layer to reach a temperature of at least 500 degrees C.

18. The method of claim 17, wherein the substrate reaches a temperature of no more than 500 degrees C. as a result of the exposing.

19. The method of claim 9, wherein the at least one dopant comprises Ta and/or Nb.

20. The method of claim 9, wherein the layer comprising titanium oxide is the outermost layer in the thin film coating.

21. The method of claim 9, wherein the sputter-depositing of the intermediate layer is room temperature sputtering.

* * * * *